May 7, 1968     E. H. SCHULTZ, JR     3,381,540
FRICTIONAL DRIVE PULLEY
Filed Sept. 3, 1965
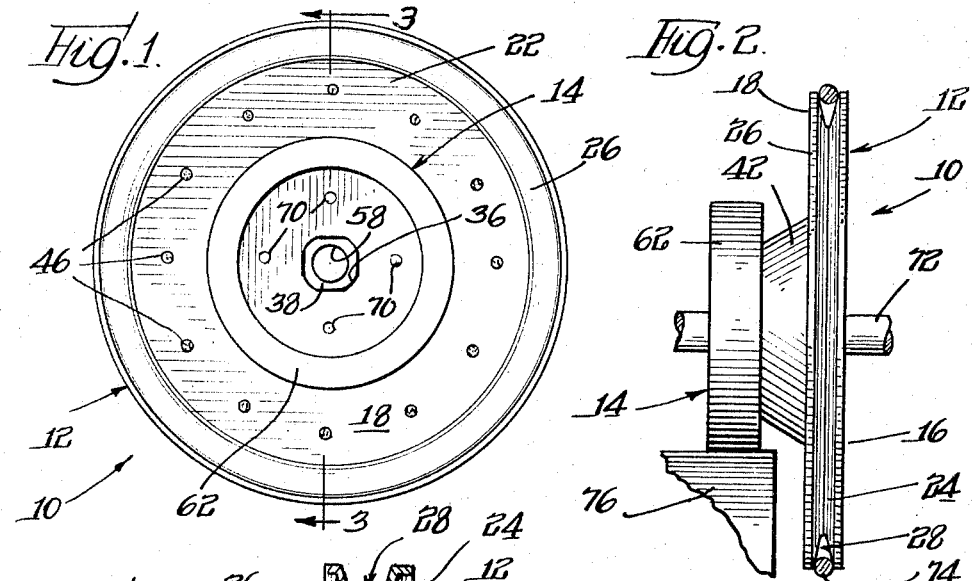
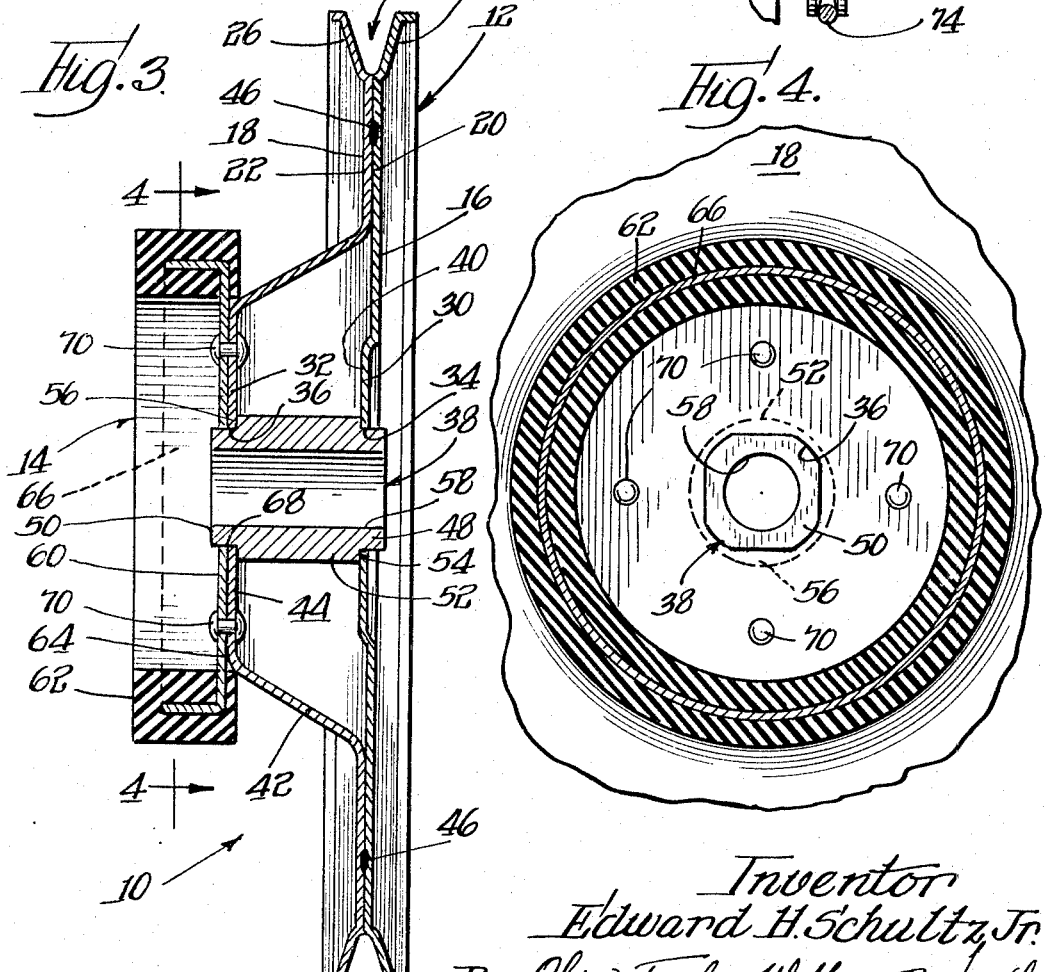
Inventor
Edward H. Schultz, Jr.
By: Olson, Trexler, Wolters & Bushnell
attys United States Patent Office 3,381,540
Patented May 7, 1968

3,381,540
FRICTIONAL DRIVE PULLEY
Edward H. Schultz, Jr., Chicago, Ill., assignor to The Nagel-Chase Manufacturing Company, Chicago, Ill., a corporation of Illinois
Filed Sept. 3, 1965, Ser. No. 484,799
8 Claims. (Cl. 74—203)

ABSTRACT OF THE DISCLOSURE

This invention relates to a pulley device including a pair of sheet material members having diverging portions defining a pulley. Frictional drive means is secured to the pulley. This frictional drive means includes a rigid base member having an axially projecting rim and a drive element of tough, resiliently deformable friction material mounted on the rim.

DISCLOSURE

This invention relates generally to pulleys and more particularly to pulleys that are arranged both for free rotation on a shaft and for receiving driving force from one element while transmitting that force at an increased or reduced speed to a second element.

Stepped pulleys comprising two distinct pulley grooves of different root diameter have been used for many years to transmit driving force from one belt to another. However, drive arrangements which incorporate stepped pulleys require that cooperating pulleys be affixed to both the driving and the driven shafts. Thus, at least three shafts, two belts and three pulleys are necessary to complete the drive train.

Accordingly, an important object of the present invention is to provide a speed-changing pulley which is arranged for direct coupling to the driven element.

Another object of the invention is to provide a pulley which is capable of use in a simple drive train.

A more general object of the invention is to provide a new and improved pulley of the freely rotatable type.

These and other objects and features of the invention will become more apparent from a consideration of the following descriptions.

In order that the principles of the invention may be readily understood, a single embodiment thereof applied to a domestic clothes drier, but to which the application is not to be restricted, is shown in the accompanying drawing wherein:

FIG. 1 is a side elevational view of a pulley constructed in compliance with the present invention;

FIG. 2 is an end elevational view of the pulley of FIG. 1 shown coupled to a power transmitting belt and a clothes drier drum;

FIG. 3 is an enlarged, central sectional view taken substantially along the line 3—3 of FIG. 1; and FIG. 4 is a sectional view taken substantially along the line 4—4 of FIG. 3.

Referring now in detail to the drawing, specifically to FIGS. 1 and 3, a speed-changing pulley that is indicated generally by the reference numeral 10 will be seen to include a pulley unit 12 and a frictional drive unit 14. The pulley unit 12 specifically comprises a pair of sheet material members 16 and 18; and these members are fashioned with annular abutting portions 20 and 22 respectively and with diverging portions 24 and 26 disposed radially outwardly of the abutting portions 20 and 22 to define a pulley groove 28. In addition, the sheet material members 16 and 18 have axially spaced portions 30 and 32 respectively which are disposed radially inwardly of the abutting portions 20 and 22 and which are provided with central openings 34 and 36 respectively, the openings 34 and 36 being adapted to receive a hub 38 in a manner to be described more fully hereinafter. With particular reference to FIG. 3, the portion 30 of sheet material member 16 includes an annular panel 40 which is deflected axially inwardly of the plane of portion 20, and the cooperating, spaced portion 32 includes a frusto-conical wall 42 which converges axially outwardly to terminate in a base panel 44 that includes the opening 36. The sheet material members 16 and 18 are interconnected at the abutting portions 20 and 22 by means of an arcuate series of weldments 46.

In order to provide strength, ease of fabrication, economy and ease of connection, the sheet material for the members 16 and 18 is selected to be steel of a suitable type and temper; and since the pulley 10 is intended to be freely rotatable on the receiving shaft, the hub 38 is fabricated from a suitable rigid, bearing material such as, for example, oil-impregnated, sintered iron. The hub 38 is coupled to the sheet material members 16 and 18 coaxially with the pulley groove 28, and the hub is provided with opposite end portions 48 and 50 which are mateably received in the openings 34 and 36. It is necessary that the sheet material members 16 and 18 be non-rotatably coupled to the hub 38; and for this purpose, the opening 36 in sheet material member 18 is made non-round, specifically hexagonal, as is well shown in FIGS. 1 and 4. Cooperatively, the end poriton 50 of hub 38 is fashioned with a corresponding cross-section. In order to avoid alignment problems, the opening 34 and the associated end portion 48 of hub 38 are made circular in outline.

In order to support the edges of openings 34 and 36 and in order to prevent axial collapse of the spaced portions 30 and 32 of the sheet material members 16 and 18, the hub 38 is provided with a medial section 52 that is of greater radial extent than the end portions 48 and 50. Thus, the medial section 52 defines oppositely facing shoulders 54 and 56. As will be appreciated, the hub 38 includes a central cylindrical bore 58.

In compliance with the features of the invention, the pulley 10 includes the frictional drive unit 14. Structurally, the unit 14 comprises a rigid base element 60 and an annular tire or drive element 62, element 62 being fashioned of a tough, resiliently deformable friction material. The base element 60 is fabricated with an annular panel 64 and an axially projecting, annular formation or rim 66 which merges with the panel 64. The panel 64 is provided with a central perforation 68 which coincides with the shape of opening 36 in order to pass the end portion 50 of hub 38. Thus, when the panel 64 and the base panel 44 are fastened together in abutting contact, there is a double thickness of material for supporting the non-round section of end portion 50. The hub 38 is thereby coupled non-rotatably to the remainder of the pulley in a strong and secure manner. In the illustrated embodiment, rivets 70 fasten the base element 60 to the base panel 44. Advantageously, the friction material of drive element 62 is selected to be suitably compounded rubber composition; and in such case, the drive element 62 is readily attached to the base element 60 by being molded about the rim 66 and the adjacent portion of panel 64 in compliance with the showing of FIG. 3. If care is exercised in molding to avoid flash on the panel 64, the rivets 70 may be replaced by spot welds if desired.

In use, the pulley 10 is mounted on a shaft 72 as is shown in FIG. 2, the hub 38 admitting the shaft 72 in freely rotatable relationship. Rotational force is delivered to the pulley 10 by means of a drive belt 74 that is fittingly received in the pulley groove 28. Correspondingly, rotative force is transmitted from the pulley 10 to the wall of a drum 76 by means of frictional engagement between the drum and the tire 62. As will be recognized, the peripheral speed of tire 62 is less than the peripheral speed of the root of pulley groove 28 because of the differences in diameter. However, it is to be recognized that the opposite relationship could be readily arranged. Furthermore, it is to be realized that the tire 62 may contact either the outside surface or the inside surface of a cylindrical element which it is desired to drive, it being shown contacting the outside surface of drum 76. As will also be recognized, the belt 74 may be driven directly from the shaft of a motor or other power source. Accordingly, only the pulley 10 and a drive pulley need be involved in the power train delivering drive force to the drum 76 or a similar member.

The specific example herein shown and described is to be considered as being primarily illustrative. Various changes beyond those described will, no doubt, occur to those skilled in the art; and such changes are to be understood as forming a part of this invention insofar as they fall within the spirit and scope of the appended claims.

The invention is claimed as follows:

1. A pulley device comprising: first and second sheet material members having abutting portions, diverging portions located radially outward of said abutting portions to define a pulley groove, and axially spaced portions disposed radially inwardly of said abutting portions; fastening means interconnecting said abutting portions of said first and second sheet material members; hub means mounted in engagement with a central portion of both said first and second sheet material members for mounting the pulley device on an axle; a third sheet material member including a radially projecting side section positioned in abutting engagement with the axially spaced portion of said second sheet material member, and an axially projecting rim section connected to a radially outermost end portion of said side section; connection means fixedly fastening the side section of said third sheet material member to the axially spaced portion of said second sheet material member; and a drive element of tough resiliently deformable friction material mounted on said axially projecting rim section of said third sheet material member, said drive element having a generally circular outer surface for rolling engagement with a rotatable member to transmit drive forces between the rotatable member and a belt mounted in engagement with the pulley groove formed by said first and second sheet material members.

2. A pulley device as set forth in claim 1 wherein: said drive element is mounted on said third sheet material member and adheres to radially inner and outer surfaces of the rim section of said third sheet material member to fixedly connect said drive element to said third sheet material member.

3. A pulley device as set forth in claim 1 wherein: said hub means includes a first end portion in fixed engagement with the central portion of said first sheet material member and a second end portion in fixed engagement with both the central portion of said second sheet material member and a central portion of said third sheet material member to fixedly locate the pulley groove and drive element relative to each other and said hub means.

4. A pulley device as set forth in claim 1 wherein: said rim section of said third sheet material member and said drive element are located radially inwardly of the pulley groove whereby the pulley groove has a greater tangential velocity than the outer surface of said drive element when the pulley device is rotated.

5. A pulley device comprising: a pulley unit defining a groove for receiving a belt; and a drive unit fixedly connected to said pulley unit, said drive unit including a generally annular friction drive element mounted radially inwardly of and coaxially with the groove defined by said pulley unit, said friction drive element having first and second generally cylindrical drive surfaces, said second generally cylindrical surface being located radially inwardly of and in axial alignment with said first generally cylindrical drive surface, said first and second drive surfaces being engageable with rotatable members to transmit drive forces between the rotatable members and a belt mounted in engagement with the drive defined by said pulley unit.

6. A pulley device as set forth in claim 5 wherein: said drive unit and said pulley unit are mounted in coaxial alignment on a common hub element.

7. A pulley device as set forth in claim 5 wherein: said drive unit further includes a support member having a radially extending central section and an axially extending annular rim section connected to said central section, said drive element being formed of a resiliently deformable friction material secured to axially extending radially inner and radially outer surfaces of said annular rim section.

8. A pulley device as set forth in claim 7 wherein: said pulley unit is at least partially formed by first and second interconnected sheet material members mounted on a hub element; and said support member of said drive unit is formed of sheet material and is fixedly connected to said second sheet material member.

References Cited

UNITED STATES PATENTS

| | | | |
|---|---|---|---|
| 992,901 | 5/1911 | Pipkin | 74—230.7 |
| 1,376,742 | 5/1921 | Burnett | 74—230.7 |
| 2,654,260 | 10/1953 | Lewis | 74—203 |
| 2,670,630 | 3/1954 | Williams | 74—203 |
| 2,780,107 | 2/1957 | Sorrell | 74—203 |
| 3,069,919 | 12/1962 | Schultz | 74—230.8 |

FRED C. MATTERN, JR., *Primary Examiner.*

C. J. HUSAR, *Assistant Examiner.*